United States Patent [19]

Chan et al.

[11] Patent Number: 5,801,866
[45] Date of Patent: Sep. 1, 1998

[54] LASER COMMUNICATION DEVICE

[75] Inventors: Victor Chan, San Diego; Michael Rivers, Santee; James Menders; Scott Bloom, both of San Diego, all of Calif.

[73] Assignee: Trex Communications Corporation, San Diego, Calif.

[21] Appl. No.: 667,400

[22] Filed: Jun. 21, 1996

Related U.S. Application Data

[63] Continuation-in-part of Ser. No. 935,899, Aug. 27, 1992, Ser. No. 199,115, Feb. 22, 1994, and Ser. No. 221,527, Apr. 1, 1994.

[51] Int. Cl.⁶ ............................................. H04B 10/00
[52] U.S. Cl. ..................................... 359/172; 359/152
[58] Field of Search .............................. 359/172, 159, 359/152, 154

[56] References Cited

U.S. PATENT DOCUMENTS

| | | | |
|---|---|---|---|
| 4,603,975 | 8/1986 | Cinzori | 359/172 |
| 4,605,959 | 8/1986 | Colbaugh | |
| 4,648,131 | 3/1987 | Kawaguchi et al. | 359/172 |
| 4,884,137 | 11/1989 | Hanson et al. | 359/159 |
| 4,970,589 | 11/1990 | Hanson et al. | 359/159 |
| 5,005,213 | 4/1991 | Hansen | |
| 5,027,433 | 6/1991 | Menadier et al. | 359/172 |
| 5,164,858 | 11/1992 | Aguilera, Jr. et al. | 352/587 |
| 5,200,827 | 4/1993 | Hanson et al. | 359/172 |
| 5,202,741 | 4/1993 | Snyder | |
| 5,267,010 | 11/1993 | Kramer et al. | |
| 5,394,259 | 2/1995 | Takahara | 359/142 |
| 5,418,869 | 5/1995 | Seike et al. | 358/24 |
| 5,426,295 | 6/1995 | Parikh et al. | 250/227.1 |
| 5,488,500 | 1/1996 | Glance | 359/127 |
| 5,594,580 | 1/1997 | Sakanaka et al. | 359/172 |

*Primary Examiner*—Raphael Bacares
*Attorney, Agent, or Firm*—Fish & Richardson P.C.

[57] ABSTRACT

A portable laser communication transceiver for transmitting and receiving information imposed on laser beams. A communication signal is imposed on a laser beam having a divergence of between 1 degree and 4 degrees. The beam is directed by an operator, sighting through a telescopic viewing device, at a distant transceiver which collects light in the laser beam with a. In preferred embodiments, the transceivers are handheld and each comprises a microphone and earphones allowing operators to talk with each other. Digital information can also be transmitted from personal computers and other electronic information equipment at the location of each operator. In a preferred embodiment useful for military and surveying applications, a GPS, a compass and a laser ranging system is provided. This enables the operator to sight through a binocular to a target and determine its position in longitude, latitude and elevation. Target position information can then be transmitted to a distant transceiver which in this case could be a base transceiver.

13 Claims, 12 Drawing Sheets

RECEIVER FARADAY FILTER TRANSMISSION (FOR FILTERING BEACON BEAM AT RECEIVING TRANSCEIVER)

$\ell$ = 1 cm
B = 50 G
T = 121° C

VOIGT EFFECT STABILIZATION FILTER TRANSMISSION (FOR LOCKING TRANSMIT BEAM)

$\ell$ = 1 cm
B = 610 G
T = 102.5° C

REFERENCE CELL TRANSMISSION (Cs ABSORPTION PEAKS NO MAGNETIC FIELD)

9.2 GHz
0.22 nm

OPTICAL FREQUENCY (INCREASING TO LEFT)

LASER COMMUNICATION DEVICE

This invention relates to communication systems and in particular to laser communication transceivers. This application is a continuation-in-part application of Ser. No. 07/935,899, entitled "Voigt Filter" filed Aug. 27, 1992, of Ser. No. 08/199,115 entitled Laser Communication Transceiver and System filed Feb. 22, 1994 and of Ser. No. 08/221,527, entitled Point to Point Laser Communication Device, filed Apr. 1, 1994.

BACKGROUND OF THE INVENTION

Free space laser communication originated in the mid-1960's shortly after the generation of light by the first lasers. The first successful laser communication up-link to space was achieved during a series of experiments conducted by NASA in the late 1960's using a ground based argon laser transmitting to a photomultiplier optical receiver feeding data to an rf down link. Information was sent by Morse code at about one-half bit per second. A limiting factor on free space laser communication is the presence of background light, mostly reflected sunlight. Efforts have been made to develop very narrow-band filters matched to the operating wavelengths of available light weight dependable lasers. Some of these efforts are disclosed in "Selected Papers on Free-Space Laser Communication", SPIE Milestone Series, Vol. MS30. Global Positioning Systems (GPS's) currently available provides latitude, longitude and altitude position based on analysis of radio frequency signals from orbiting satellites.

What is needed is a laser portable communication transceiver device which could be used to transmit information point to point over distances ranging from a few feet to several kilometers.

SUMMARY OF THE INVENTION

The present invention provides a portable laser communication transceiver for transmitting and receiving information imposed on laser beams. A communication signal is imposed on a laser beam having a divergence of between about 1 degree and about 4 degrees. The beam is directed by an operator, sighting through a telescopic viewing device, at a distant transceiver which collects light in the laser beam and extracts the communication signal. In preferred embodiments, the transceivers are handheld and each comprises a microphone and speakers or earphones allowing operators to talk with each other. Digital information can also be transmitted from personal computers and other electronic information equipment at the location of each operator. In a preferred embodiment useful for military and surveying applications, a GPS, a compass, a tilt gage and a laser ranging system is provided. This enables the operator to sight through a binocular to a target and determine its position in longitude, latitude and elevation. Target position information can then be transmitted to a distant transceiver which in this case could be a base transceiver.

Preferred embodiments weighs less than 1.3 pounds, use about 5 Watts of electrical power and transmit information at the rate of 100 kilobits per second at distances of several km through the atmosphere. At these data rates, voice and data transmission are both feasible. Other embodiments can transmit in excess of 1 million bits per second. These transceivers can be used for communication: ground to ground, ground to air, air to air, ship to ship and ship to air.

DETAILED DESCRIPTION OF PREFERRED EMBODIMENTS

Portable Laser Communication Transceiver

Figure 1:
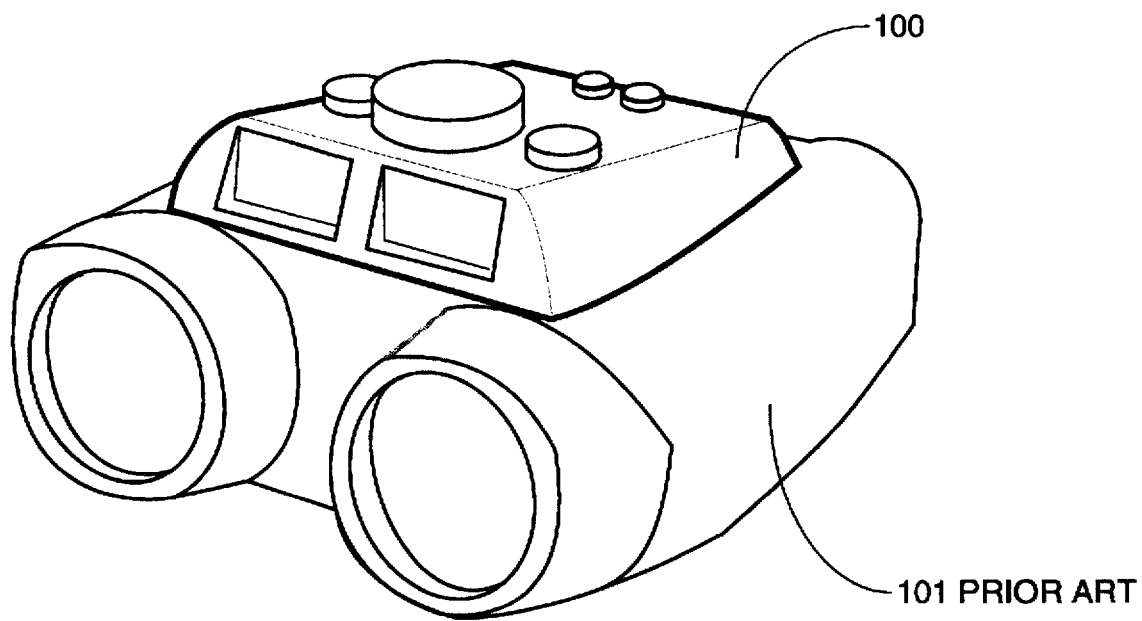
FIG. 1 is a schematic drawing of a preferred embodiment of the present invention.
Figure 2:
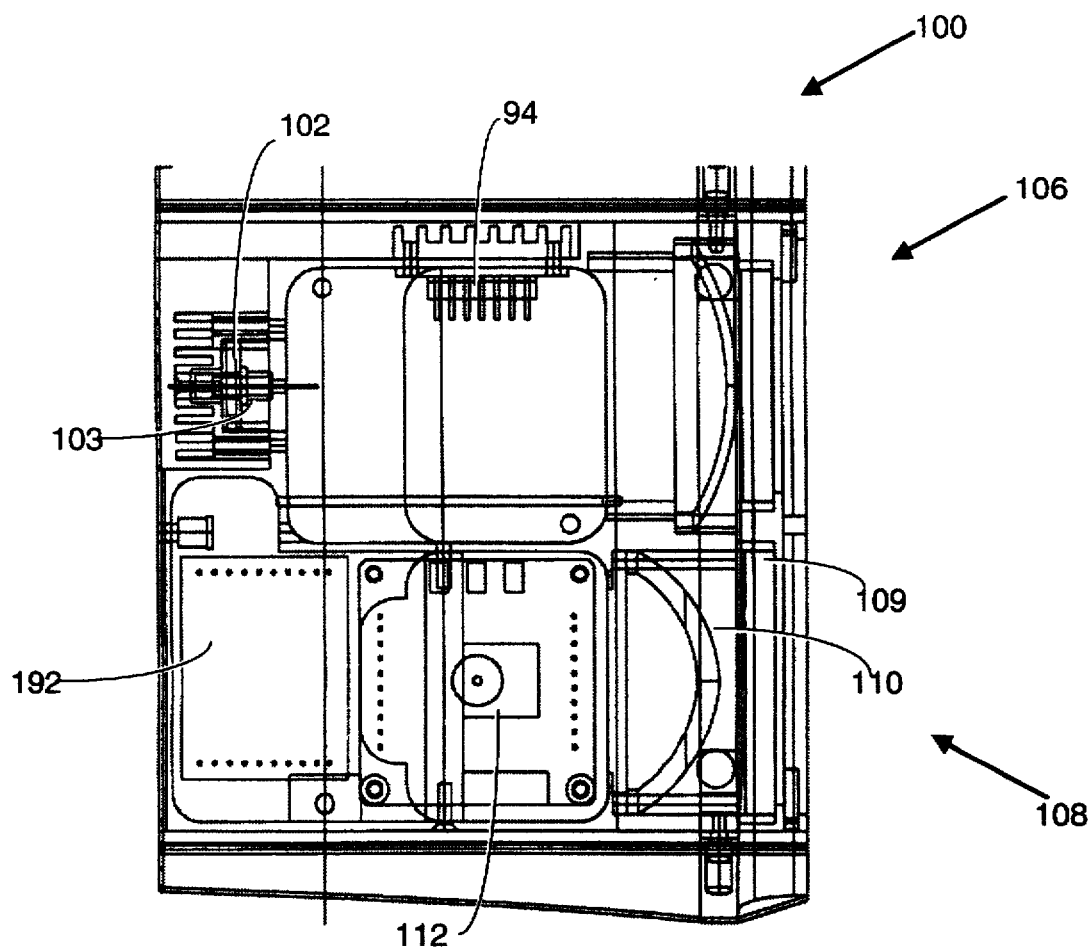
FIGS. 2 and 3 are two views of a preferred transceiver unit.
Figure 3:
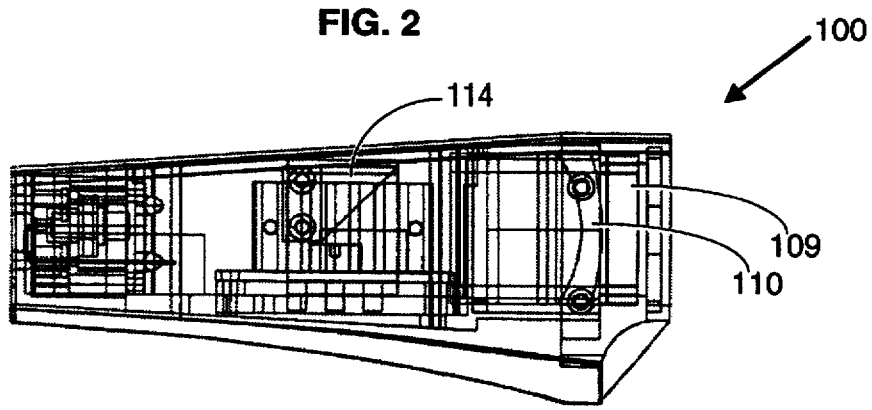

The present invention permits covert free space communication using a very light weight low power transceiver. Information is carried on a low power laser beam having a divergence of about 1 to 4 degrees. Divergence in this range is small enough that the dispersion of the beam is minimized and large enough that the beam's "footprint" can cover the receiving unit without special aiming equipment other than ordinary hand held telescopic devices such as video cameras, binoculars and telescopes.

The laser beam will dissipate and degrade as a function of the distance it travels through the atmosphere and embodiments of the present invention can be configured for use under a variety of atmospheric conditions and distances. Signal to noise values should be large enough to permit the quality of communication desired, and the many factors affecting signal to noise are considered along with factors such as cost and weight in developing particular products pursuant to the teachings of the present invention. Two specific embodiments of the present invention are described in detail in this specification. The first embodiment utilizes a conventional optical filter in the receive unit of the transceiver in order to filter out background light. (Conventional filters are relatively poor filters as compared to atomic line filters; however, they can be simple, cheap and generally present no operational problems.) The second embodiment described in detail utilizes a very narrow band atomic line filters with a dramatic improvement in signal to noise but the unit could be more costly to produce and significantly more complicated. A comparison of some of the principal features of these two embodiments is made in the following table:

| Atomic Line Filter vs. Conventional Filter | | |
|---|---|---|
| | ALF | CF |
| Bandwidth | 0.01 nm | 3.5 nm |
| Field of View | Wide up to 60 Degrees | Narrow, a Few Degrees |
| Insertion Loss | 60% | 30% |
| Size of Filter | Several cm Thick | 5 mm Thick Plate |
| Power | 5 W | Unpowered |
| Companion Laser | Precision, Narrowband Frequency Locked Laser Diode | High Peak Power Pulsed Laser |
| General Description | Costly, High Performance, Wide Field of View | Relatively Inexpensive, Moderate Performance, Moderate Field of View |

FIRST PREFERRED EMBODIMENTS—CONVENTIONAL FILTERS

Binocular Location-Communication Unit

A preferred embodiment of the present invention can be described by reference to FIGS. 1 through 4.

For this embodiment, Applicants have mounted a specially designed laser transceiver on a commercially available direction indicating binocular 101 supplied by Leica Technologies, Inc. having offices in Leesburge, Va. This binocular, sold under the trademark LEICA VECTOR, comprises a laser range finder, electronic compass and an electronic tilt gage. In addition, Applicants have incorporated an electronic GPS monitor and computer electronics and software so that the operator can determine the latitude, longitude and elevation of a point of interest merely by pointing the binoculars to it and recording its range, compass direction, tilt angle and GPS position of the operator. The operator can then transmit the location information to a laser receiver by pointing the binoculars in the direction of the receiver and switching to a transmit mode. The laser transceiver is shown as 100 mounted on the LEICA VECTOR binocular 101 in FIG. 1. A more detailed view of the transceiver is shown in FIGS. 2A and 2B. The transceiver comprises laser communications receiver unit 108 and laser communication transmit unit 106.

Transmit Unit

Laser communication transmit unit 106 is designed to transmit information at the rate of 100 Kb/s on an 852 nm laser beam. The unit includes a GaAlAs pulse diode laser 103, Model 2100 provided by SDL with offices in San Jose, Calif. It is cooled by thermoelectric cooler 102 which in turn is controlled by controller 94. It is important that the output of transmit unit 106 comply with eye safety requirements. This is accomplished in this embodiment by allowing the beam from laser diode 103 to expand until the beam intensity becomes eye safe. The beam is then transformed into a beam with a divergence in x and y of about 2° with cylindrical plano-concave lens (CVI RCC-40.0-25.4-508.6-C PCCV CYL) and a plano-concave lens (Melles Griot LPX161 PCVX).

For eye safety, the average intensity in any 7 mm circle must not exceed 2 mW/cm$^2$. At the transmitter output the beam footprint is oval with dimensions of 10.8 mm and 43.2 mm which is large enough so that a diode output of 10 mW (average power) will produce intensities less than 2 mW/cm$^2$ assuring eye safety. At 100 meter the beam diverges to about 3.8 m (horizontal) and 4.2 m (vertical). The approximate divergence of the beam is 2.2° in the vertical and 2.4° in the horizontal. Operators have no trouble holding the beam on a companion transceiver with beam divergence in the range of about 2 degrees. At less than about 1 degree, keeping the beam on target is difficult and at more than about 4 degrees dispersion tends to be a problem.

Receive Unit

The laser communication receive unit 108 in this embodiment is designed to receive digital free space laser communication at a wavelength of about 852 nm at the rate of 100 kbits/sec. Interference filter 109 blocks a substantial amount of the background light but permits transmittal of light within the range of about 848 to 852 nm.

Laser light at 852 nm from a transmit unit is collected by objective lens 110 reflected off turning mirror 114 and focused onto the 1.5 mm active area of avalanche photo diode 112. In this preferred embodiment Applicant utilizes commercial photo detector model C6018 provided by Hammamatsu with offices in San Diego, Calif.

The high voltage power supply for photo diode A is shown at 111.

Electronic Components

Figure 4:
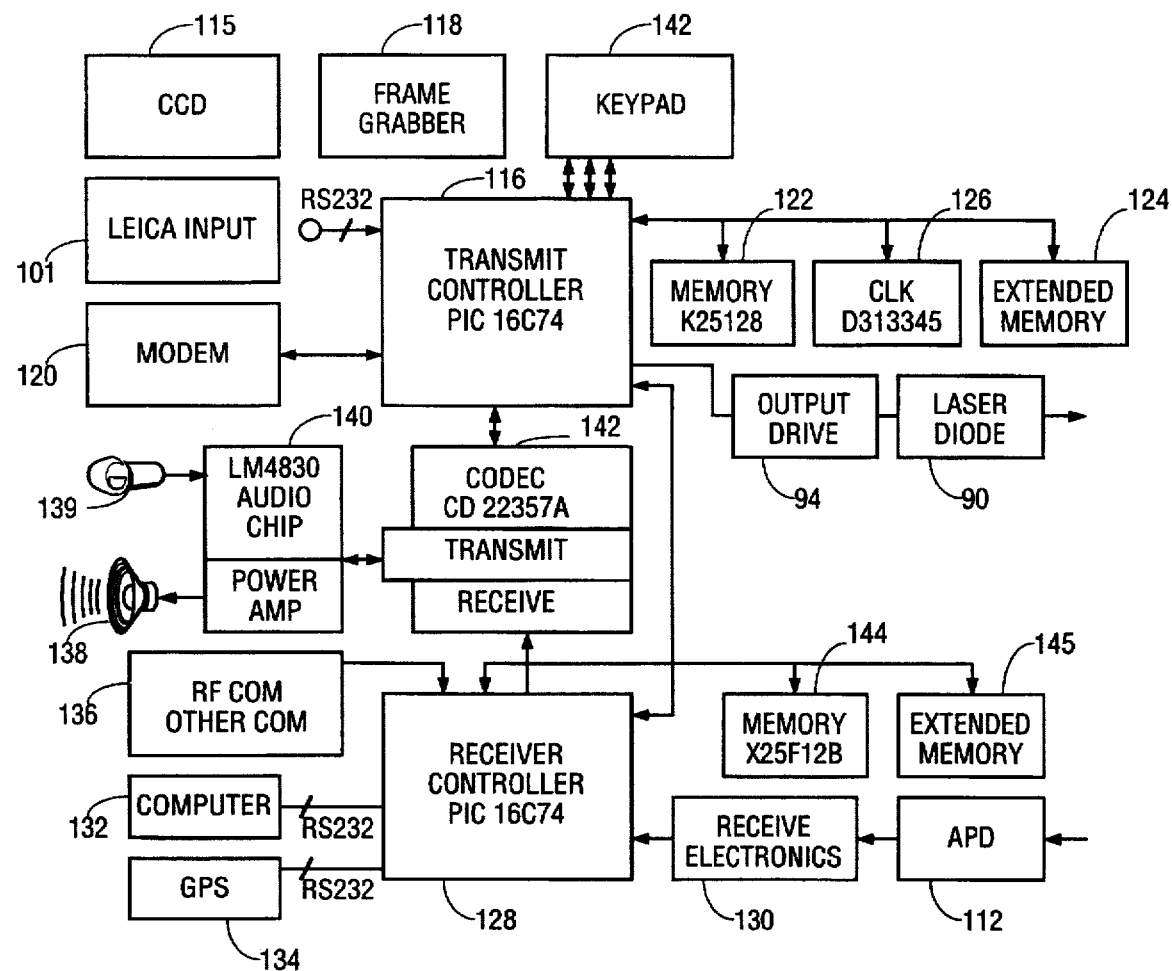
FIG. 4 is a block diagram showing the principal electronic and optical components of a preferred embodiment of the present invention.

The principal electronic components of this preferred transceiver are shown in block form in FIG. 4. The transmit controller 116 is a microprocessor, Model PIC 16C74-20L supplied by Microchip, with offices in Phoenix Ariz. Input to the microprocessor is provided by electronic output from Leica direction indicating binocular 101. The transceiver is also provided with connections to connect additional inputs to the transmit controller 116. This includes CCD 115 connected through frame grabber 118. A preferred frame grabber is provided on a circuit board as a model FF supplied by Current Technology Inc. with offices in New Hampshire. A standard modem 120 may also provide input to the controller from electronic devices such as fax machines. Memory chips 122 and 124 and a clock chip 126 also provide input to transmit controller 116. The transmit controller directs output electronic controller 94 which drives laser diode 90 to provide the transmit signal.

Receiver controller 128 is also a microprocessor like transmit controller 116. It receives input from avalanche photodiode 112 through receive electronics 130. This processor can also receive input from computer 132, GPS system 134, and other communication equipment represented in the drawing at 136. The receiver controller 128 provides input to the transmit controller 116 and to speaker 138 through audio system 140.

Transmission of Information

The transceiver unit described above is capable of transmitting digital data at 100 kB/s as stated above. This information transmitted includes voice communication by the operator, directional data from the LEICA VECTOR unit and GPS data. Applicants have provided parts in the unit to connect additional sources of information from other electronic information equipment. Applicant's preferred transmission approach is to utilize pulse position modulation (PPM) in which the time interval between pulses is varied to transmit either a 1 or a 0. For example a 1 can be represented by a 10 microsecond interval between pulse rise times and a 0 can be represented by a 10.5 microsecond time interval between pulse rise times.

Audio is processed by a National Semiconductor LM4830 two way audio amplifier system 140. The microphone output is amplified by the LM4830. The audio is then filtered, compressed then digitized by the CD22357 codec processor 142. After processing in the codec processor, the digitized audio is retrieved by the transmit controller. There the digital signal is converted to a PPM code. After PPM coding the signal is sent to the laser diode driver 94 for transmission.

When the operator desires to transmit the Leica data the data is time and date stamped and is shifted from the Leica by the transmit controller through operator operation of one of the switches 142 into the transmit controller. The data is converted to a PPM coded signal then sent to the laser driver electronics 94. The Leica data is transmitted with a 16 bit header identifier that tells the receiver that it is receiving data and not voice. GPS data is transmitted as follows: The data is shifted into the receive controller via RS232 interface. It is then transferred to the transmit microcontroller which then places the data into memory with a time and date stamp on it. The data is transmitted as explained above for the Leica data. CCD camera data are digitized and stored in memory then processed as explained for the Leica data.

Data from another transceiver is detected and amplified with a Hamamatsu avalanche photodiode 112 which comes equipped with a preamp and high voltage circuitry. Receive microcontroller 128 converts the PPM format to a binary format. The controller checks coding on the transmitted information to determine the type of data sent. The integrity of transmitted data may be checked using standard techniques. The data may then be stored in memory. Data may also be transferred to computer 132. Computer data may also be transmitted from the computer through controller 128 to controller 116.

If voice data is detected it is transmitted from the receive microcontroller (after PPM to binary conversion) to the CODEC processor 142. The signal is converted in CODEC processor to audio and the dynamic range is expanded and amplified and used to operate speaker 138.

Provision can also be made for radio transmission and reception. This would be a very useful addition for those circumstances when laser communication is not possible because of severe atmospheric conditions such as heavy rain or heavy smoke or if a direct line of sight between transceivers is not possible. An RF communication link is indicated at 136 in FIG. 4. Data stored in memory units 122, 124, 144 and 145 can be shifted from controller 128 via an RS232 link into a radio transmitter such as a SINGCARS unit (SINGCARS are standard military radio units) or any one of many commercially available radio units. Voice communication could be directly through the radio unit.

Other Embodiments with Conventional Filter

By substituting a CCD camera for the binoculars and providing a monitor, the direction to a companion transceiver or a target could be shown with cross hairs on the monitor if the target is in the camera's field of view or an indication could be provided on the monitor to prompt camera movement toward the desired direction.

SECOND PREFERRED EMBODIMENTS—
ATOMIC LINE FILTERS

Preferred embodiments of the present invention using the atomic line filter can be described by reference to FIGS. 5 through 11.

Filter Unit

Figure 5:
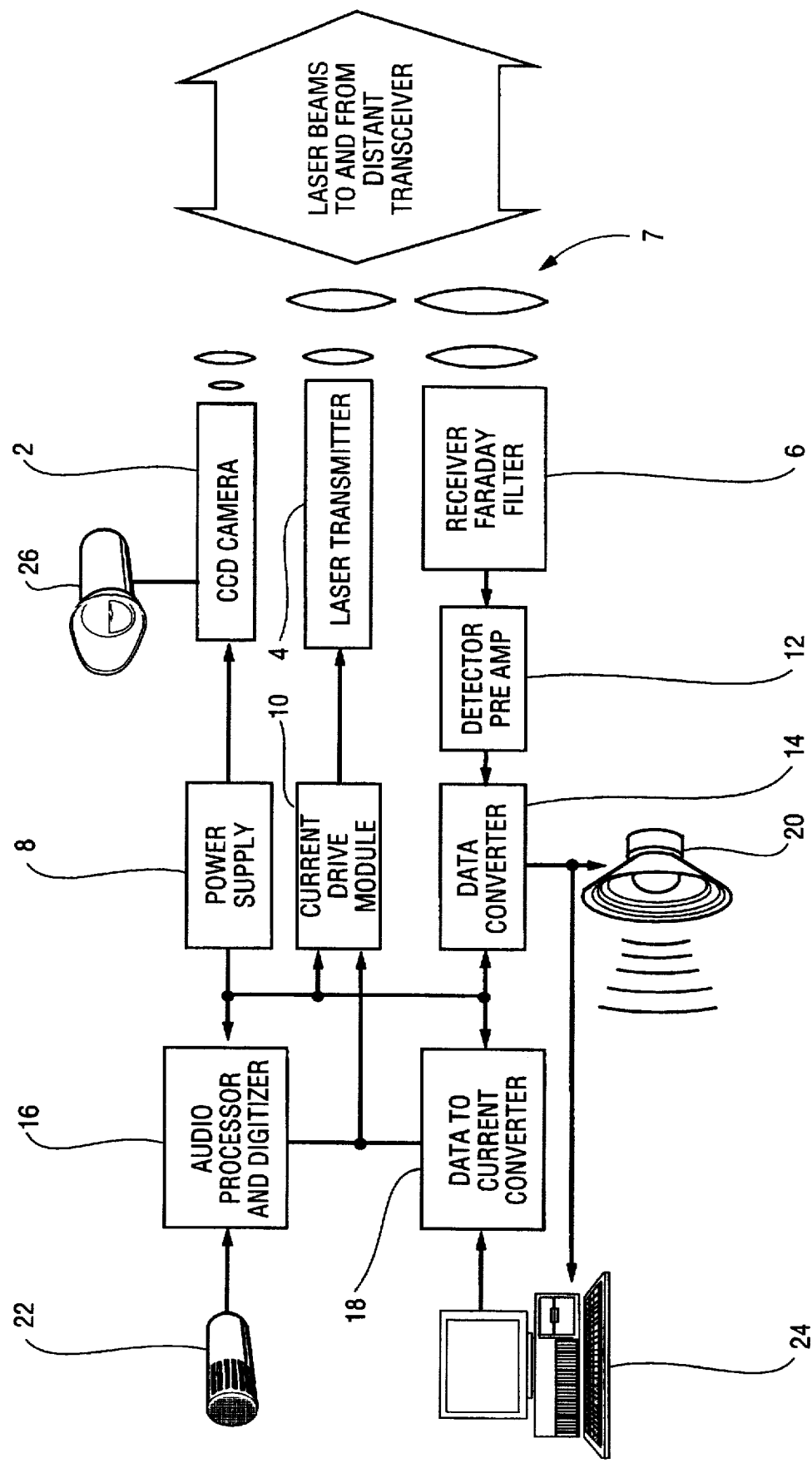
FIG. 5 is a block diagram of a preferred embodiment of the present invention.
Figure 6:
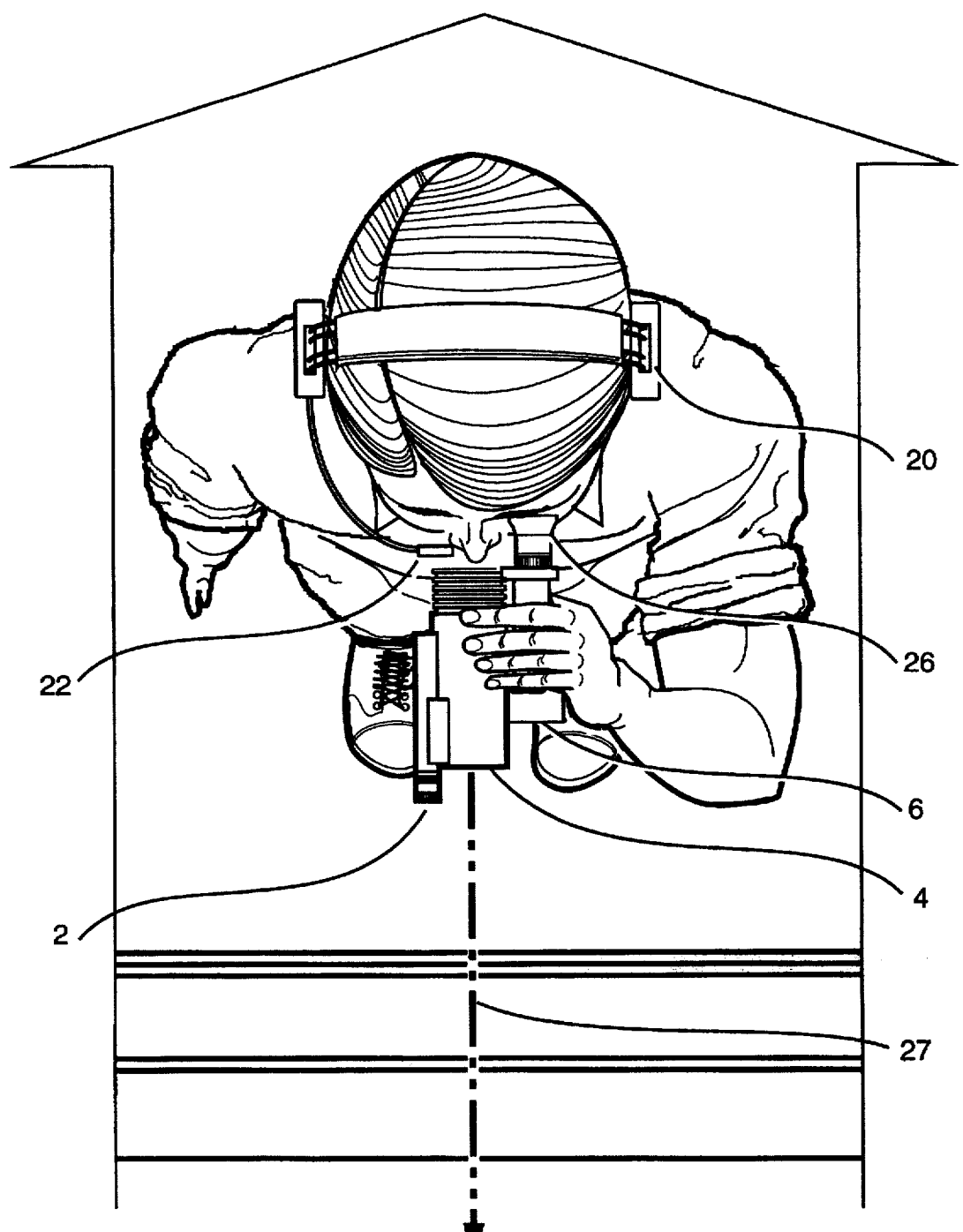
FIG. 6 is a drawing of the device referred to in FIG. 1 in use.

The general layout of one preferred embodiment of the present invention is shown in block diagram in FIG. 5 and in use in FIG. 6. The principal components are identified in these figures. These components are a CCD camera 2, a Voigt filter wavelength locked laser transmitter 4, a receiver Faraday filter 6 and an electronic viewfinder 26. Also shown as accessory components are a microphone 22 and an earphone/speaker 20.

Wavelength Locked Laser Transmitter

Figure 7:
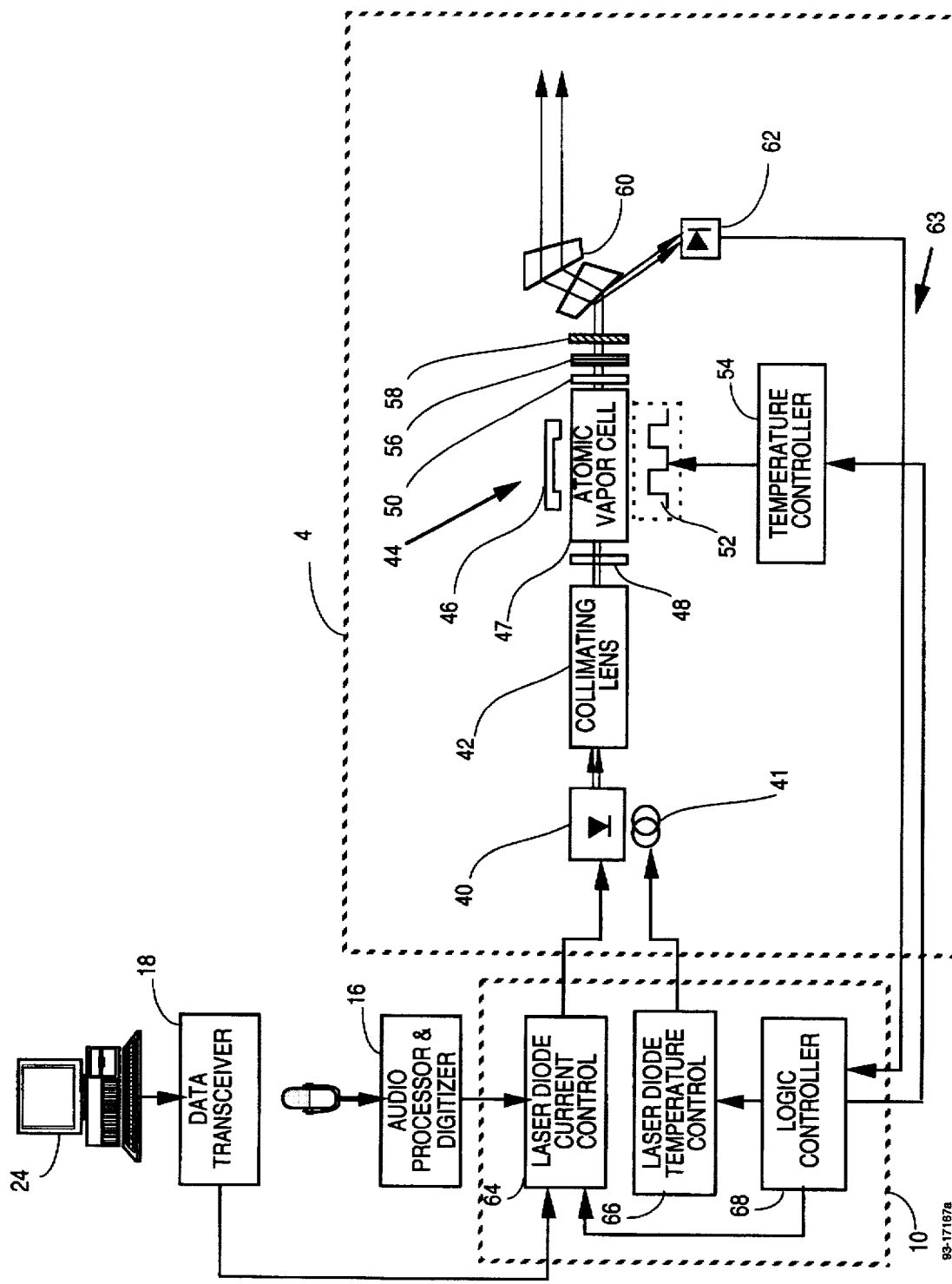
FIG. 7 is a block diagram showing the components laser transmitter referred to in FIG. 1.
Figure 8:
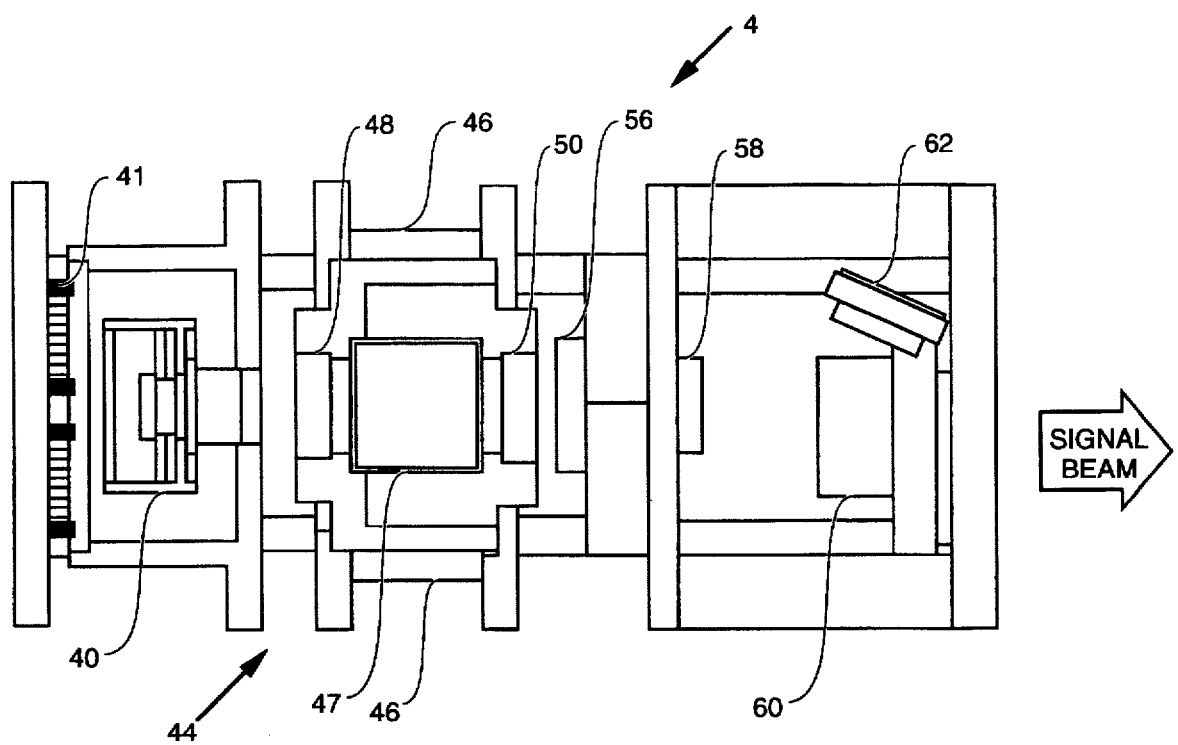
FIG. 8 is a cross section drawing of the above transmitter.
Figure 9:
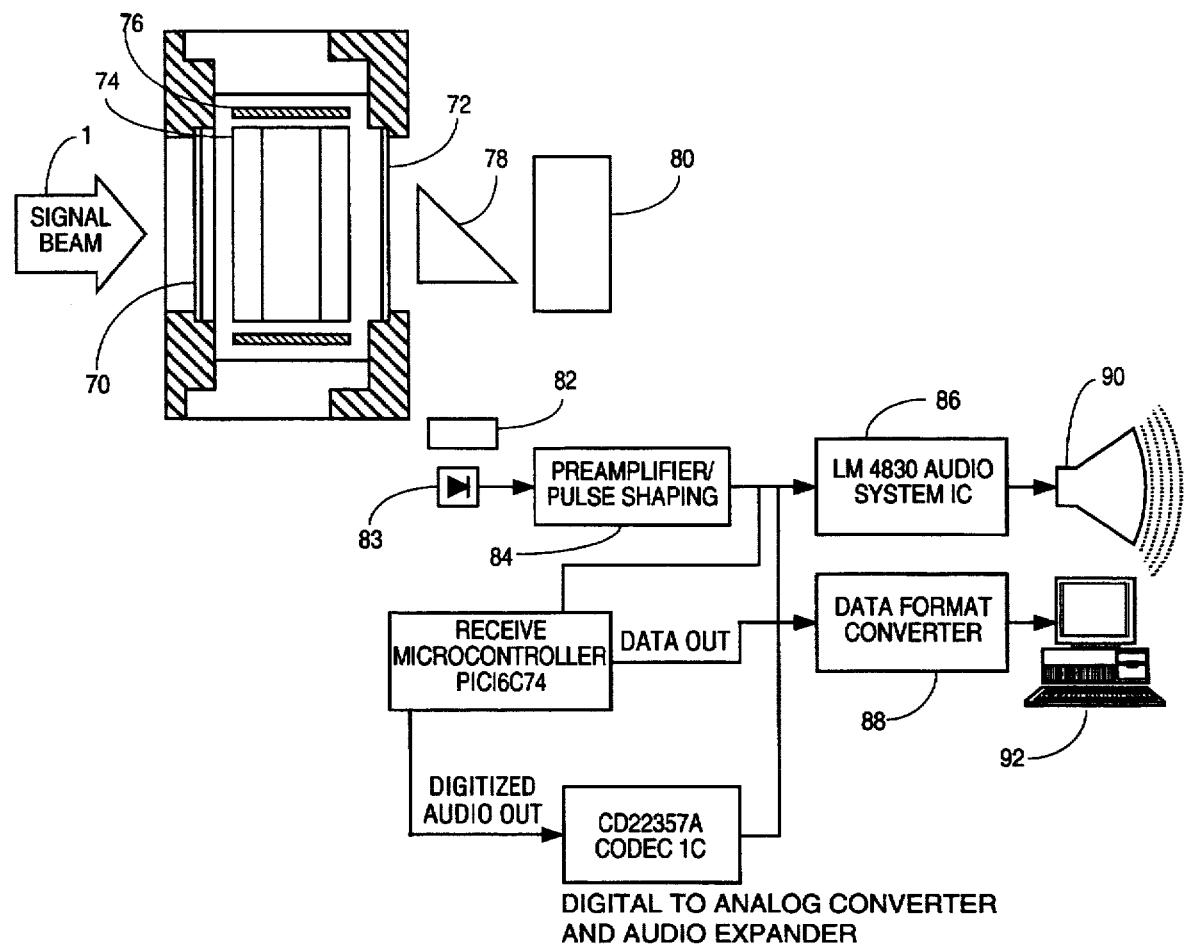
FIG. 9 is a part cross section drawing part block diagram showing the receiver module of the above preferred embodiment.
Figure 12A:
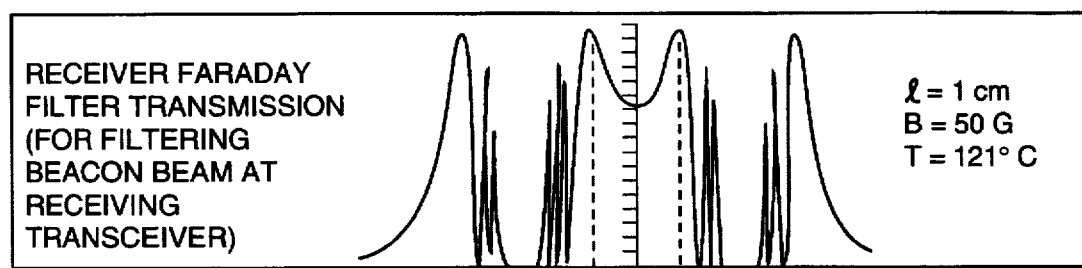
FIGS. 12A, 12B and 12C show transmission specter of Voigt and Faraday filters compared to absorption's spectrum of cesium.
Figure 12B:
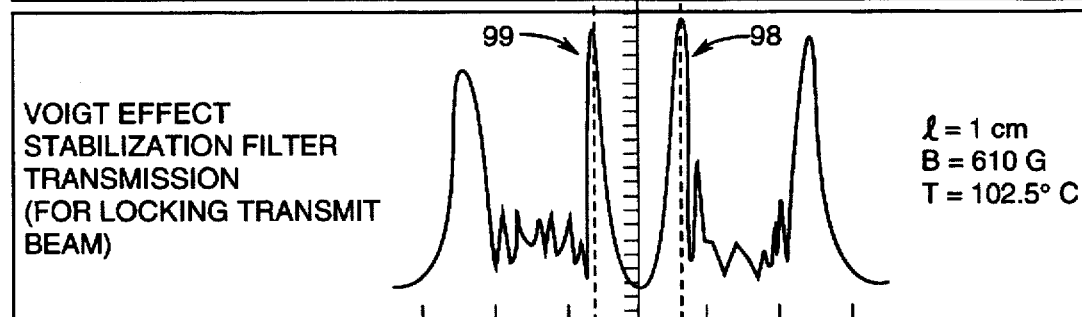

The elements of transmitter 4 are described in FIG. 7, 8 and 9. A laser beam is provided by 150 mWatt diode laser 40 supplied by SDL. This laser with appropriate shaping optics produces a beam width divergence of 2 mrad and operates nominally at 852 nm wavelength. In this preferred embodiment, we lock the laser at one of the precise wavelengths at or very near 852.11 nm, which corresponds to the $6s_{1/2}$ $6p_{3/2}$ transition in cesium. To do this, the laser system is configured into a wavelength controlled unit as shown in FIG. 7. This control is achieved using temperature control and current control of the laser and a Voigt filter 44. The control of the laser is provided by thermoelectric heat pump 41 and temperature controller 66. The output of diode element 40 passes through lens assembly 42 and through Voigt filter 44. Voigt filter 44 is similar to a Faraday atomic line filter except the magnetic field is at a right angle to the beam direction. (The Voigt filter is described in more detail in a following section of this specification.) A magnetic field produced by permanent magnets 46 at right angle to the laser beam operates on an atomic vapor (in this case cesium at about 100° C.) in order to provide four extremely narrow pass bands near 852 nm as shown in FIG. 12B. Crossed polarizers 48 and 50 stop essentially all light which does not have its polarization rotated within the filter. The polarization of light near the atomic resonance is rotated 90° within the filter. Feedback mirror 56 passes 80 percent of the light incident on it and reflects 10 percent. The 10 percent of the light is reflected back into diode laser 40 forcing it to lock at the selected wavelength. The light beam passing through feedback mirror 56 passes through additional optics to convert the beam to a circular polarization. These optics consists of a ½ wave plate 58 to rotate the polarization to match an anamorphic prism pair 60 which circularizes the beam. The resulting output is a 60 mW circularly polarized laser beam with a wavelength of 852.11 nm and a divergence of about 2 mrad. (This divergence results in a footprint with a 10 m diameter at a distance of 5 km.). A feedback circuit 63 is provided to control the diode current and maintain the output at the selected precise wavelength.

The laser diodes we use are provided by SDL, Model No. SDL 5421-G1. The temperature of the diode is regulated by two Melcor FC 0.6-65-06-1 thermoelectric heat pumps. The heat pumps are driven by a Wavelength Electronics FPT 2000 thermoelectric cooler controller. The temperature of the laser diode is maintained to within ±0.05° C. of the required temperature for optimum wavelength stability. The laser diode is driven by a low noise, voltage controlled current source. The current source used to drive the laser diode is from Wavelength Electronics FPL 250. The laser diode output is collimated with a Rodenstock 1403.108 lens and passes through the Voigt filter. The temperature of the cesium vapor cell is controlled by a Wavelength Electronics RHM 4000 Controller driving a Dawn Electronics DS 1112 Heater with temperature sensor epoxied to the vapor cell body. The temperature is maintained at 102.5° C. to achieve the proper transmission spectrum. The transverse magnetic field of 610 gauss is supplied by two magnets (Dexter Permag #ND35570048) located on either side of the vapor cell. The field is oriented 45° to the polarization of laser light and 90° to the beam direction. Corning 900-HC crossed polarizers stop all light which does not have its polarization rotated 90° within the filter. A CVI PRI-850-20-0537 partially reflective mirror is used to pass 80% of the light incident on it and reflect 10%. A CVI QWPO-850.0-05-2 half wave plate is used to rotate the polarization by 90° so that the polarization is perpendicular to the long axis of the laser light. This is necessary because a Melles Griot 06-GPA-004 anamorphic prism pair is used to circularize the elliptical laser light. The input of the anamorphic prism pair is at Brewsters angle and there would be a 50% loss in light if the polarization were not corrected. A small portion of the laser light is reflected off the input surface of the anamorphic prism pair. An Advanced Photonix SD-1004121231 amplified photodiode 62 is used to detect this reflected light. The signal is used for closed loop control of the laser transmitter output and wavelength.

The microcontroller 68 is used to monitor and control all functions of the laser transmitter. Upon power-up it insures that no modules are enabled, the shutter is closed and all supply voltages are present. After a period of two seconds it will accept a laser enable command. When the enable command is received, the locking and receive oven heaters and the thermoelectric heat pump will be enabled. When the microcontroller senses the locking oven has reached 80° C. the laser diode current drive module will be enabled. This will allow the electronics to be stabilized when the locking filter has reached its operating temperature of 102.5° C. When the oven reaches 95° C. the microcontroller will ramp the laser diode drive current up and down by driving a sixteen bit up/down counter. The counters output is connected to a digital to analog converter whose output drives the input of the voltage controlled current source. The current source 64 is a Wavelength Electronics FPL-250 current driver. Output monitor photodiode is digitized and sent to the micro controller 68. The micro controller will drive the laser diode current up or down searching for the peak output as sensed by the output monitor photo diode. Once the maximum output is detected the micro controller will then control the output drive current to maintain maximum light output from the laser assembly. The output of the laser is sampled every ten seconds and compared with the previously sampled output and the current is changed to maintain a constant output if there is a difference of ±5 percent or more. If the current controller does not detect any light output from the laser it will then change the temperature of the laser diode in one half degree increments while ramping the current above and below the predetermined set point of the laser until light is detected from the laser. At that point the peak power output algorithm is initiated. In between the laser output signal conversions the laser temperature and oven temperature are digitized and stored. This is done to note any fault conditions and so that the previous operating conditions will be stored and used the next time the transceiver is used. This will decrease warm up time by using previously known operating conditions. The laser current is also digitized and stored for the same reason.

Imposing Signal on Beam

The audio output from at the microphone is amplified by a National Semiconductor LM 4830 Audio System IC then filtered, compressed and digitized by a Harris Semiconductor PCM Codec IC Model CD 22357A. The digital output of this integrated circuit is then scaled to the proper level to drive the laser diode. With a voltage to current scaling factor of 40 millivolts per milliampere, the five volt digital is scaled to 200 millivolts (5 mA). This 200 millivolt (5 mA) digital signal is then summed with the steady state laser diode drive current. The result is that for each signal pulse the wavelength of the laser beam is shifted off the transmission peak so that there is no transmission. The net result is the transmission of a digitally modulated laser beam as shown at 27 in FIG. 6.

Data Interface

The input from a terminal or host computer can also be transmitted by the laser. This involves converting the data format to a TTL (0 to 5 volt level) and then shifting it to the 200 millivolt level required to shift the laser wavelength. In this instance it was decided to use the RS-232 format for data transfer, though any number of data formats could have been selected. A Maxim # MAX-233 RS-232 to TTL converter integrated circuit board was used in this device because it requires few support components.

Receiver Unit

The principal element of the receiver unit of embodiment shown in FIGS. 5 and 6 are shown in block and cross section form in FIG. 9. Signal beam 1 enters Faraday filter unit 6 through polarizer 70 which polarizes the light in a horizontal direction. An axial magnetic field created by magnet 80 operating on cesium vapor heated to about 102° C. by heater 76 in vapor cell 74 causes a rotation of only that portion of the light spectrum at wavelengths at sharp Cs absorption lines near 852 nm. That light which was so rotated passes through vertical polarizer 72 and is reflected off mirror 78 onto an Advanced Photonix APM-20 avalanche photodiode 83. Other light is blocked by vertical polarizer 72 and 852 nm narrow band filter (Andover #850FS40-12.5) 82. The detected signal is amplified, shaped then converted to a TTL level by pulse shaper 84. If the signal is audio, the signal is decoded and processed by a Harris Semiconductor CD22357A Codec IC then amplified by a National Semiconductor LM4830 Audio System IC. If the signal was a data transmission then it would be converted to a RS-232 level by a Maxim MAX-233 integrated circuit (or other standard RS232 drive/receiver IC) for input to a computer 92.

Side Locked Laser

The advantage of the in line locked laser and the side locked laser transmitters is that only a very small modulation current is required to modulate the laser. With the in line locked laser, as the wavelength is shifted out of the pass band of the locking filter there will be no signal output. If the signal is intercepted the digital modulation would easily be detected.

Figure 10:
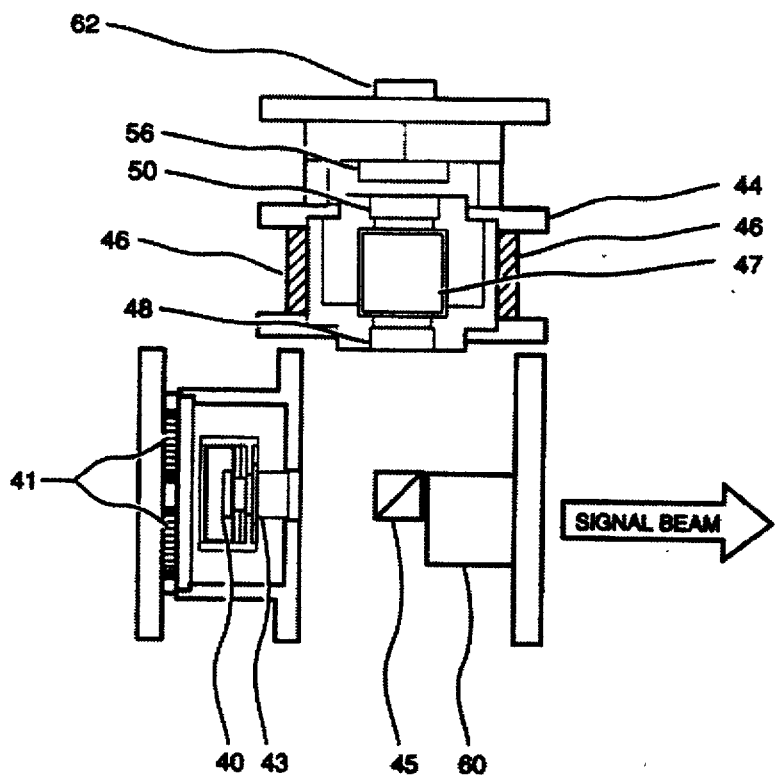
FIG. 10 is a cross section drawing of a side-locked transmitter of a second embodiment of the present invention providing for additionally secure transmission.

The side locked laser has the added feature of a continuous output signal with no apparent form of modulation. The theory of operation is as follows. Referring to FIG. 10, the laser current drive source, laser temperature control, and oven temperature heating and control are identical to the type used in the in-line transmitter described previously. The laser light emitted from the laser diode assembly 40 is collimated and passes through a non polarizing beamsplitter 45. Fifty-five percent of the light is transmitted and circularized by an anamorphic prism pair. The remaining 45% of laser light is turned 90° and directed through a Voigt filter. The light that is in the pass band of the Voigt filter 44 is passed through the filter and onto a partially reflecting mirror 56 which reflects about 90% of the light. The mirror is aligned such that the light is reflected back through the locking filter onto the beamsplitter and back onto the laser diode. The light reflecting into the laser forces the laser to lase at the transmission peak of the Voigt filter. A small portion of the light that is incident upon the feedback mirror 56 is not reflected but passes through the mirror. This light is detected by a photo diode 62 and used to control the output power and wavelength of the laser in the same manner as that of the in-line filter. Because the locking filter is not in line with the transmitter laser light, and the light is shifted out of the pass band of the Voigt filter, it is not blocked by the filter providing a continuous output. The signal is imprinted on the beam by a slight shifting of the drive current of the laser diode, which has the effect of slightly the shifting the signal wavelength out of the Faraday filter passband. This makes detection of the signal easy by the receive unit but an "eavesdropper" (even if able to intercept the beam) would not be able to detect the signal unless he also had an atomic line filter (ALF) matched to the locked wavelength.

Faraday and Voigt Filters

Figure 11:
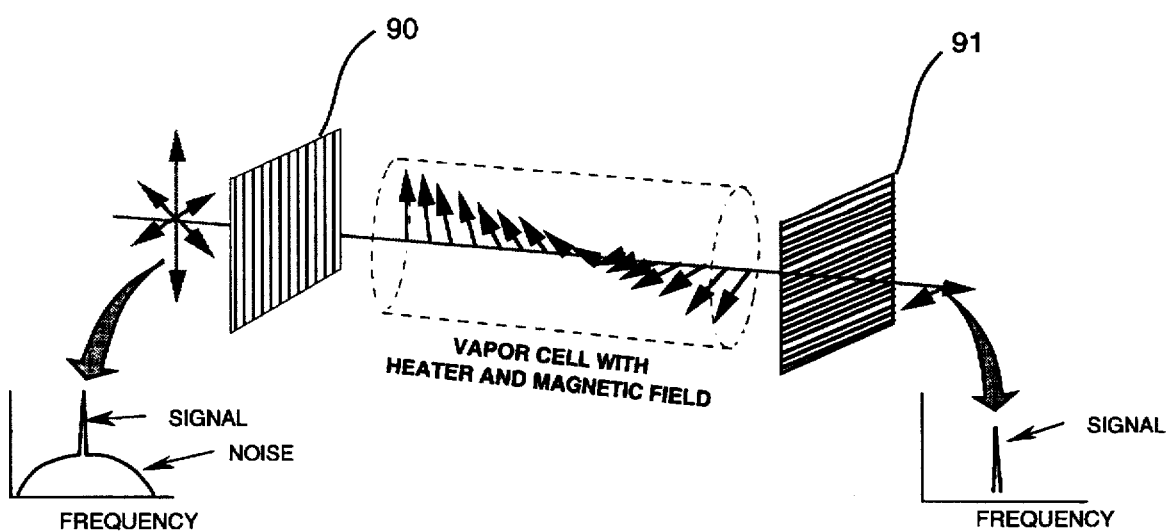
FIG. 11 is a drawing explaining the principal of Faraday and Voigt filters.

Operational principles of our Faraday filter can be understood by reference to FIG. 11. Crossed polarizers 90 and 91 serve to block out background light with a rejection ratio better than $10^{-5}$. We use high transmission polarizers which have a transmission of higher than 95%. Because these polarizers only work over a limited wavelength region in the infrared, a broad band interference filter is used in conjunction with the Faraday filter. Between the polarizers an atomic vapor (in this case cesium having a strong resonance near the wavelength of the beacon beam) in a magnetic field axially aligned with the path of the beam rotates the polarization of the beacon laser signal by 90°, while leaving other wavelengths unrotated, and thus blocked by the polarizers. The path of the transmitted light is unaffected, so spatial information is maintained.

Figure 12C:
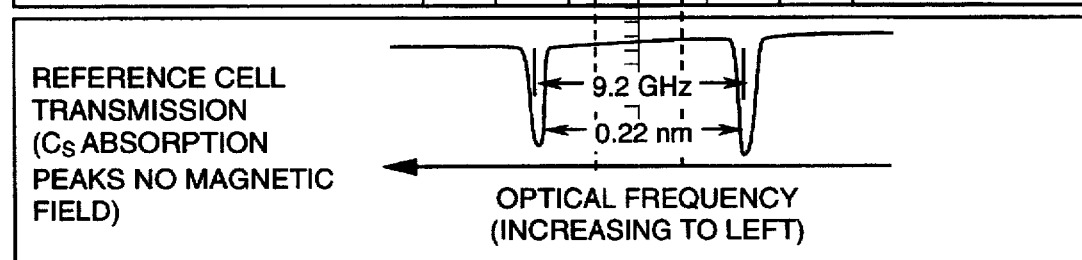

Polarization rotation is due to the separation in optical absorption frequencies for right and left circularly polarized light in the magnetic field due to the Zeeman effect. The index of refraction of the vapor near an absorption is different from 1, and the absorption separation causes the index to be different for right and left circular polarization at a given frequency, and thus those polarizations travel through the vapor with a different phase velocity. The effect of this is to cause a frequency dependent rotation in the polarization of the incoming linearly polarized light which only occurs near the atomic absorption peak. Transmission through the filter is maximum where the polarization rotation is 90°, 270°, etc., provided that the frequency of the beam is far enough away from the atomic resonance not to be absorbed. The Voigt filter is similar to the Faraday filter. In the Voigt filter, a magnetic field is arranged so that the field lines are perpendicular to the beam direction. The vapor acts like a half wave plate rather than a Faraday rotation to achieve 90° polarization rotation. Transmission spectra in the range of 852 nm for cesium for the Faraday filter is shown in FIG. 12A and that for the Voigt filter is shown in FIG. 12B. (This spectrum is saturated with the laser power used in the locked beacon.) Note that the transmission peaks are much sharper in the Voigt filter as compared to the Faraday filter. We use this to our advantage when we pick the Voigt filter to lock our beacon transmitter laser and when we pick the Faraday filter for use in our receiver unit. This allows us to accommodate for Doppler shifts due to relative velocities of the satellites. In our preferred embodiment we can operate one of our beacon lasers at the lower frequency designated as 98 in FIG. 12B and the other one at the higher frequency 99. This allows us to accommodate both approaching and receding satellites. If we know the receiving satellite is approaching we can set both beacons at the lower peak 98. The transmission spectrum for cesium vapor absent a magnetic field is shown in FIG. 12C. The path length through the cesium vapor is 1 cm in both cases. The Faraday filter is operated at a temperature of 121° C. and in a magnetic field of 50 gauss as shown on the figure. The Voigt filter is operated at 95° C. and 600 G.

Alternate Transmitter Wavelength Control

Figure 13A:
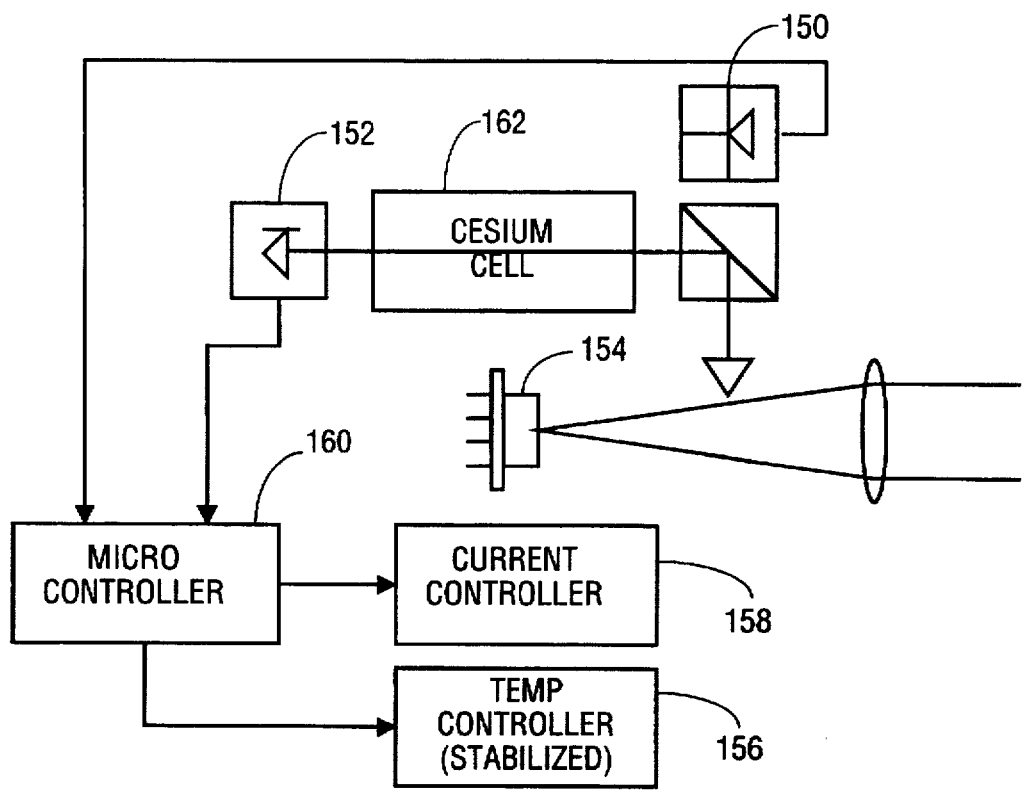
FIGS. 13A and 13B are drawings describing an alternative method of controlling transmission wavelengths.
Figure 13B:
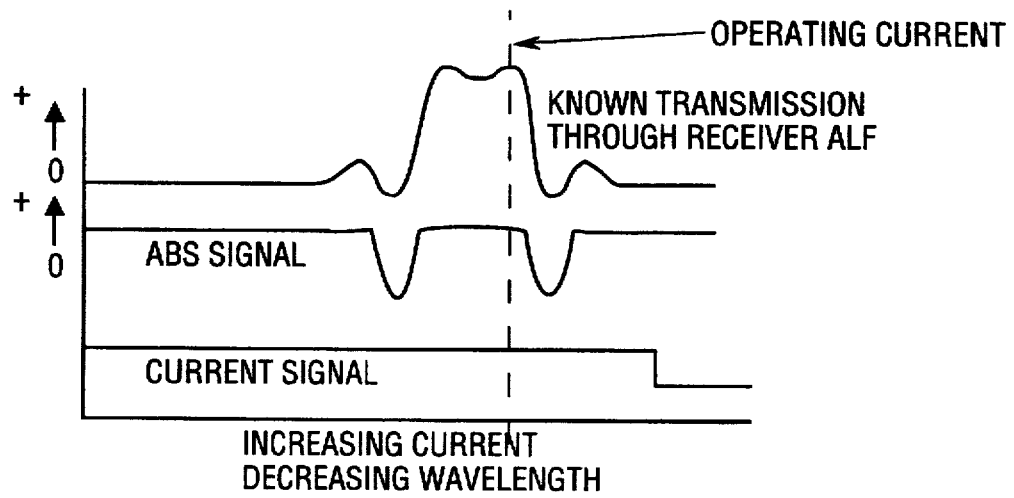

FIGS. 13A and 13B describe an alternate method of controlling the transmission wavelength of the transmitter to match the known pass band of the receiving unit's Faraday atomic line filter a sketch of which is shown in FIG. 13B. In this setup an SDL 5712-H1 distributed Bragg reflector laser diode 154 is controlled with temperature controller 156 and current controller 158. Temperature controller 156 controls the temperature of the laser at a constant (within 0.050 degrees C.) temperature in the range of about 25 degrees C. Feedback control is achieved with current controller 158. Microcontroller 160 keeps the current at a value, as indicated by the vertical dashed line in FIG. 13B to match a known transmission peak in the receive unit's atomic line filter. A portion of the laser beam is sampled and run through cesium absorption cell 162 and detected by photodiode 152. As shown in FIG. 13B a current matching the second ALF transmission peak is about ⅘ the distance between the cesium cell two absorption peaks of the cesium cell as detected during periodic (once per 10 seconds) calibration scans of photodiode 152. The scans take about 10 ms.

While the above description contains many specifics, the reader should not construe these as limitations on the scope of the invention, but merely as exemplification's of preferred embodiments thereof. Those skilled in the art will envision many other possible variations are within its scope. For example, persons skilled in the art will be able to make changes appropriate for communicating over shorter or longer distances than those referred to in the examples. Based on the application of the transceiver appropriate telescope or other lens equipment can be added to the transmitter unit, the receiver unit and/or the video unit as shown at 7 in FIG. 5. Accordingly the reader is requested to determine the scope of the invention by the appended claims and their legal equivalents, and not by the examples which have been given.

I claim:
1. A laser communication transceiver for transmitting information via laser beams to another laser communication transceiver and for receiving information via laser beams from said another laser communication transceiver, said transceiver comprising:
   A) a laser transmitter system comprising:
      1) at least one laser operable to produce a signal laser beam of a selected range of wavelengths;

2) a signal modulator disposed relative to said laser and configured to modulate said signal laser beam to impose a digital communication signal on said signal laser beam;

B) a laser receiver disposed relative to said laser transmitter system and configured to receive a laser beam having a selected range of wavelengths from said another laser communication transceiver comprising:
1) an optical filter closely matched to at least one wavelength of said received laser beam,
2) a signal detector operable to receive and detect communication signals that are transmitted by said another laser communication transceiver through said optical filter;

C) a telescopic viewing device operable to locate said another similar laser communication transceiver and to facilitate pointing said transceiver in a direction of said another laser communication transceiver; and D) a laser ranging unit, a GPS unit and an electronic compass.

2. A laser communication transceiver as in claim 1 further comprising a tilt gage.

3. A laser communication transceiver as in claim 1 further comprising a microphone and earphones.

4. A transceiver as in claim 1 further comprising a video camera and an electronic view finder.

5. A transceiver as in claim 1 further comprising a speaker.

6. A transceiver as in claim 1 wherein said laser receiver comprises a photo diode, a preamplifier, a frequency to voltage converter and a data converter for detecting said communication signal and distinguishing said signal as sound or digital data suitable for input to a computer.

7. A laser communication transceiver as in claim 1 wherein said telescopic viewing device comprises a binocular.

8. A laser communication transceiver for transmitting information via laser beams to another laser communication transceiver and for receiving information via laser beams from said another laser communication transceiver, said transceiver comprising:

A) a laser transmitter system comprising:
1) a Voight filter;
2) at least one laser disposed relative to said Voight filter and operable to produce a signal laser beam of a narrow band of wavelengths which is locked at or near 852.11 nm using said Voight filter;
3) a signal modulator disposed relative to said laser and configured to modulate said signal laser beam to impose a digital communication signal on said signal laser beam;

B) a laser receiver disposed relative to said laser transmitter system and configured to receive a laser beam having a selected range of wavelengths from said another laser communication transceiver comprising:
1) an optical filter closely matched to at least one wavelength of said received laser beam,
2) a signal detector operable to receive and detect communication signals that are transmitted by said another laser communication transceiver through said optical filter; and C) a telescopic viewing device operable to locate said another similar laser communication transceiver and to facilitate pointing said transceiver in a direction of said another laser communication transceiver.

9. A laser communication transceiver for transmitting information via laser beams to another laser communication transceiver and for receiving information via laser beams from said another laser communication transceiver, said transceiver comprising:

A) a laser transmitter system comprising:
1) at least one laser operable to produce a signal laser beam of a selected range of wavelengths;
2) a signal modulator disposed relative to said laser and configured to modulate said signal laser beam to impose a digital communication signal on said signal laser beam;

B) a laser receiver disposed relative to said laser transmitter system and configured to receive a laser beam having a selected range of wavelengths from said another laser communication transceiver comprising:
1) an atomic line filter configured to provide a noise equivalent bandwidth of less than 0.1 nm and to have a transmission band closely matched to at least one wavelength of said received laser beam;
2) a signal detector operable to receive and detect communication signals that are transmitted by said another laser communication transceiver through said atomic line filter; and C) a telescopic viewing device operable to locate said another similar laser communication transceiver and to facilitate pointing said transceiver in a direction of said another laser communication transceiver.

10. A laser communication transceiver as in claim 9, wherein said narrow band of wavelengths is produced with a distributed Bragg reflector laser diode with feedback control.

11. A transceiver as in claim 9 where said receiver atomic line filter is a Faraday filter.

12. A transceiver as in claim 9, wherein said receiver atomic line filter is a Voight filter.

13. A laser communication transceiver for transmitting information via laser beams to another laser communication transceiver and for receiving information via laser beams from said another laser communication transceiver, said transceiver comprising:

A) a laser transmitter system comprising:
1) a Faraday filter;
2) at least one laser disposed relative to said Faraday filter and operable to produce a signal laser beam of a narrow band of wavelengths which is locked at or near 852.11 nm using said Faraday filter;
3) a signal modulator disposed relative to said laser and configured to modulate said signal laser beam to impose a digital communication signal on said signal laser beam;

B) a laser receiver disposed relative to said laser transmitter system and configured to receive a laser beam having a selected range of wavelengths from said another laser communication transceiver comprising:
1) an optical filter closely matched to at least one wavelength of said received laser beam,
2) a signal detector operable to receive and detect communication signals that are transmitted by said another laser communication transceiver through said optical filter; and C) a telescopic viewing device operable to locate said another similar laser communication transceiver and to facilitate pointing said transceiver in a direction of said another laser communication transceiver.

* * * * *